Figure 1:
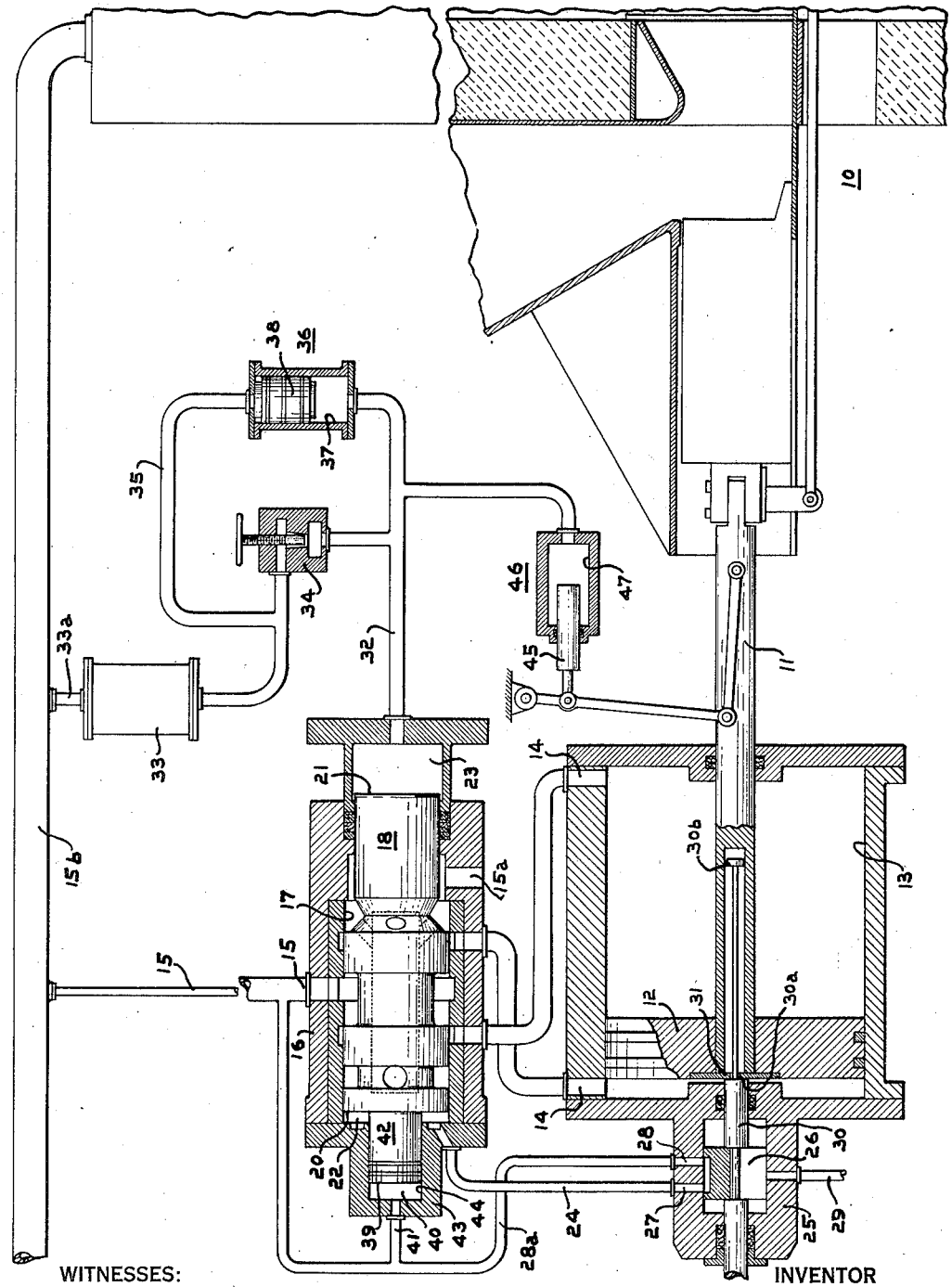

May 21, 1940.  E. R. STONE  2,201,248
RECIPROCATING FLUID MOTOR APPARATUS
Filed Dec. 9, 1938  2 Sheets-Sheet 2

WITNESSES:
James F. Mosser
C. L. Wheeler.

INVENTOR
EARLL R. STONE.
BY
A. B. Reeves
ATTORNEY

Patented May 21, 1940

2,201,248

UNITED STATES PATENT OFFICE 2,201,248

RECIPROCATING FLUID MOTOR APPARATUS

Earll R. Stone, Lansdowne, Pa., assignor to Westinghouse Electric & Manufacturing Company, East Pittsburgh, Pa., a corporation of Pennsylvania Application December 9, 1938, Serial No. 244,777

6 Claims. (Cl. 121—157)

My invention relates to reciprocating fluid motors and it has for an object to provide apparatus of this character with means operative to restrict the admission of motive fluid during working strokes to limit the velocity of the operating piston.

In the production of fluid motors for driving underfeed stokers, it is customary to provide a range of operating cylinder and operating piston diameters to suit different steam pressures. For example, for a steam pressure of 100 lbs., the cylinder diameter may be 16"; for a steam pressure of 200 lbs., the cylinder diameter may be 10"; and for a steam pressure of 300 lbs. or 350 lbs., the cylinder diameter may be 8½". If, with the said arrangement, a diameter of operating cylinder and piston is employed which is too large for the steam pressure, then the operating piston may move too rapidly for proper stoker ram operation. On the other hand, from the point of view of economy of production and installation, it is obviously desirable to be able to use a single cylinder diameter for a wide range of steam pressures; but, where a single cylinder diameter is selected for a range of pressures, it is obviously necessary that the diameter be adequate for the lowest pressure of the range and this would entail excessive operating piston and ram velocities at the higher steam pressures unless measures to the contrary were adopted. Accordingly, the present invention is concerned with a novel metering or throttling action given to the main valve and dependent upon operating piston movement to restrict steam admission for the purpose of limiting the operating piston velocity.

A further object of my invention is to provide apparatus of the above character having a main valve together wth means operatively connected thereto and including a piston area continuously to steam pressure and means cooperating piston area and responsive to move he operating piston for the purpose of the main valve so as to avoid excessive g piston velocities during working strokes thereof.

In my patent, No. 2,080,838, dated May 18, 1937, and assigned to the Westinghouse Electric & Manufacturing Company, there is disclosed and claimed a reciprocating motor having quick cut-off of motive fluid at stroke ends of the operating piston to minimize the application of motive fluid pressure to the operating piston during dwell intervals of the latter.

A further object of my invention is to provide an arrangement of this character with means for limiting the velocity of the operating piston during working strokes of the latter.

Figure 2:
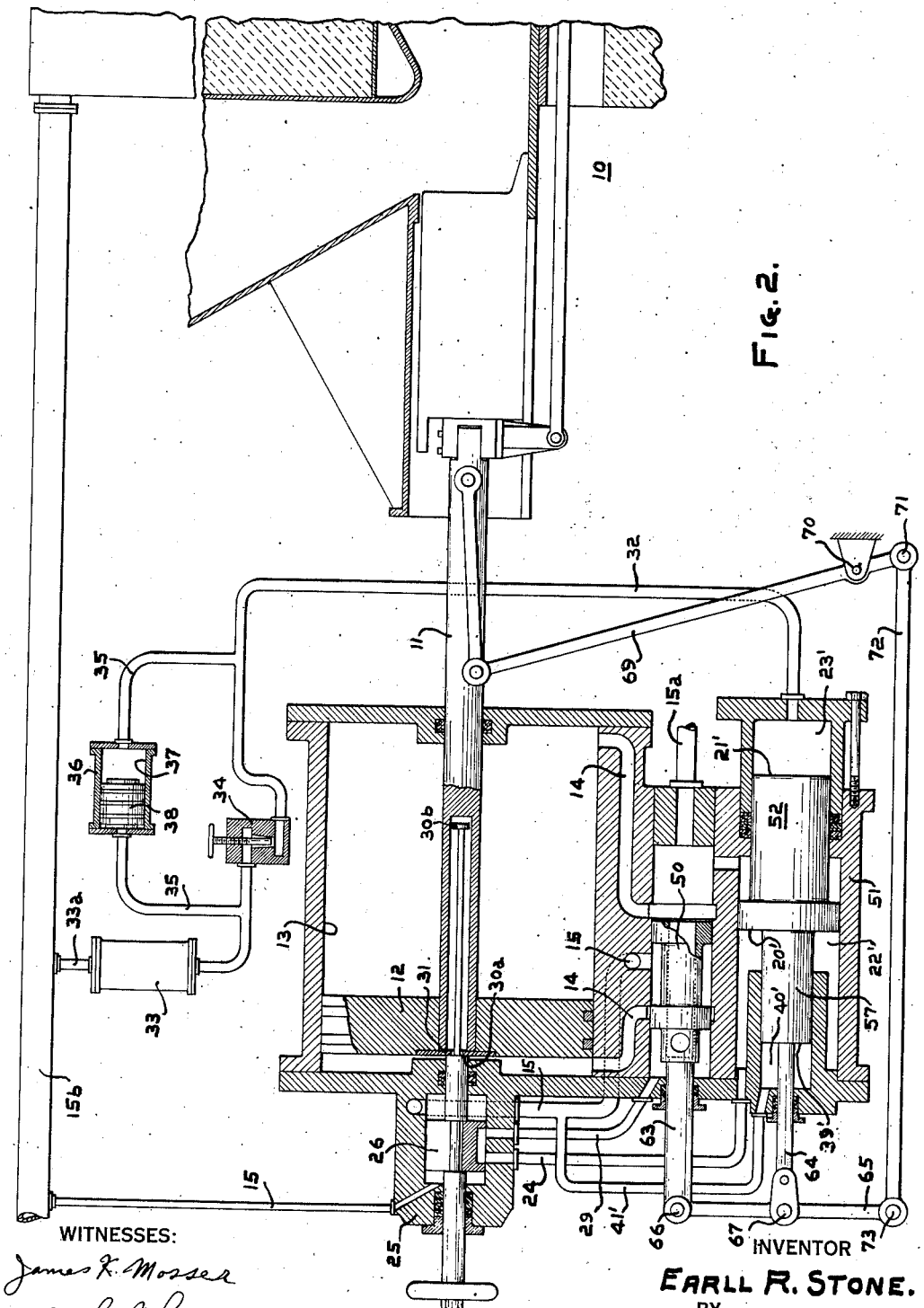

These and other objects are effected by my invention as will be apparent from the following description aud claims taken in connection with the accompanying drawings, forming a part of this application, in which:

Fig. 1 is a diagrammatic view of stoker operating mechanism incorporating the preferred form of my invention; and, Fig. 2 is a sectional and diagrammatic view of a modified form of the invention.

Referring to the drawings more in detail, there is shown a stoker, at 10, provided with a rod 11 for operating the ram thereof, the rod being connected to an operating piston 12 arranged in the cylinder 13, the operating piston and cylinder constituting a reciprocatory motor of the double-acting type. Admission and exhaust passages 14, 14 communicate with the operating cylinder adjacent the ends thereof; motive fluid is supplied by a suitable duct or passage 15 and exhausted to a suitable space 15a; and the main valve, at 16, preferably including a piston valve cylinder 17 with a piston valve 18 therein, controls communication of the passages 14 with the passage 15 and the exhaust space 15a.

As more fully explained in the patent aforesaid, the main valve, at 16, is constructed, arranged and so operated that the operating piston 12 has alternate working stroke and dwell phases, means being provided for varying the dwell phase duration in order that the stoker speed may be varied by changing the number of working strokes per unit of time.

Also, as explained in said patent, the main valve is operated to cut off quickly the supply of steam to the operating cylinder at stroke ends to avoid the application of steam to the operating piston during dwell intervals, such application during dwell intervals being productive of excessive steam consumption. To this end, motor means is provided for operating the piston valve 18 and comprising first and second piston areas or faces 20 and 21 at ends of the piston valve and arranged in first and second chambers or spaces 22 and 23, respectively, provided by the piston valve cylinder 17. Steam under suitable pressure is intermittently supplied to the first chamber or space 22 and fluid, preferably water under the same pressure, is supplied to the second chamber or space 23, the arrangement being such that, when steam pressure is cut off, the water pressure is effective to move the piston valve through a stroke in one direction; and, when the steam pressure is applied, the piston valve is moved in the opposite direction.

The first chamber or space 22 is supplied with steam by a passage or duct 24 having associated therewith the pilot valve housing 25 and the pilot valve 26. The housing 25 has a port 27 communicating with the duct 24 and pressure and exhaust ports 28 and 29, the pressure port being preferably connected by a passage 28a to said steam passage 15. In one position, the pilot valve connects the pressure port 28 to the port 27 and in the other position it connects the latter port to the exhaust port 29.

The pilot valve 26 is operatively connected to the operating piston 12 so as to be shifted from one position to the other as ends of working strokes are approached. Accordingly, the valve 26 has connected thereto a rod 30 having spaced abutments 30a and 30b which cooperates with the abutment 31 carried by the operating piston to shift the valve in this manner. In one position of the valve 26, steam will be supplied to the first chamber or space 22, and, in the other position thereof, the latter space will be connected to the exhaust.

Assuming completion of a working stroke, with quick cut-off of motive steam to the operating cylinder, as will be immediately explained, the duration of the ensuing dwell interval of the operating piston depends both on the distance the piston valve 18 has to travel to connect the ports for the next working stroke in the opposite direction and the rate at which water may flow into and be expelled from the second chamber or space 23. A conduit 32 connects the second chamber or space with a reservoir 33, the latter preferably being connected by a conduit 33a with the steam main 15b so that condensate accumulating in the reservoir will be under the same pressure as that of steam supplied to the first chamber or space 22. An orifice or metering valve 34 controls the flow rate in the conduit 32 and into or out of the chamber 23 to adjust the dwell interval.

To obtain movement of the piston valve for quickly cutting off the admission of steam at the end of a working stroke, the conduit 32 has associated therewith a by-pass conduit 35, the latter conduit being interrupted by displacement mechanism, at 36, preferably including a cylinder 37 and a piston 38. As the operating piston 12 approaches the end of a stroke, the pilot valve 26 is shifted to start the next stroke. Due to the increased flow rate of water permitted by the displacement mechanism, at 36, the initial portion of valve travel sufficient to cut off the steam supply from the operating cylinder will be effected relatively rapidly thereby assuring cut-off immediately as the operating piston reaches a stroke end for the ensuing dwell interval. The initial rapid cut-off movement of the main or piston valve continues so long as fluid may be forced into the space or chamber 23 or expelled therefrom, as determined by the displacement of the mechanism, at 36.

To provide for an operating cylinder of a given diameter operating satisfactorily with the varying range of steam pressures, it is necessary to restrict the admission of steam to prevent excessive operating piston velocities where the operating cylinder and piston diameter are large in relation to the steam pressure, the purpose of the restriction of steam admission being to limit the operating piston and stoker ram velocity. Accordingly, the operating piston or ram motion is used for this purpose, the motor means for effecting movement of the piston valve 18 preferably having an additional piston area 39 facing in the same direction as the first piston area 20 and arranged in the chamber or space 40 to which steam is continuously supplied by the passage 41.

Not only is steam pressure applied to the piston area 39 effective, with that applied to the first piston area 20, to move the piston valve 18 against the effect of water pressure applied to the piston area 21, but it is effective, jointly with the operating piston movement, to control the main valve in such manner as to restrict the admission of steam in case the operating piston tends to move too fast. The necessary linkage to secure the desired joint effect may be accomplished in any suitable manner.

In Fig. 1, the piston valve 18 has a cylindrical extension 42 of smaller diameter than its body portion, the extension having the third piston face or area 39 and the piston valve cylinder 17 being provided with a head 43 having a cylinder portion 44 for the extension 42 and providing the space or chamber 40.

The operating piston rod 11 is connected to the movable element, preferably a plunger 45, of a displacement device, at 46, including a housing or cylinder 47 for the plunger, the displacement device being connected to the aforesaid second space or chamber 23. With this arrangement, a working stroke, in one direction, is accompanied by injection of water into the space or chamber 23 by the displacement device, at 46, and, in the other direction, by the withdrawal of water from such space. If the operating piston and the ram tend to move too fast, then the water pressure in the chamber or space 23 is changed with the result that the effect thereof acts, in conjunction with the steam pressure applied to the third piston area 39, to assure of positioning of the main or piston valve to restrict the admission of steam to the operating cylinder so as to limit the operating piston velocity.

Assuming a working stroke of the operating piston in consequence of movement of the main or piston valve by steam pressure, movement of the operating piston and its rod acts on the plunger 45 to inject water therefrom into the second space or chamber 23; and, if the operating piston tends to move too rapidly, the effect of the increased rate of injection from the displacement device, at 46, is to raise the water pressure in the chamber 23 with the result that the piston valve is retarded or moved backwardly somewhat so as to restrict the admission of steam to the operating cylinder. On the other hand, with a working stroke incident to movement of the main or piston valve under water pressure, the connection is such that the displacement device, at 46, serves to withdraw water from the second space or chamber 23; and, if the operating piston tends to move too fast, then the increased rate of water withdrawal lowers the pressure in the space or chamber 23 with the result that the main or piston valve is retarded or moved backwardly somewhat so as to restrict the steam admission.

In Fig. 2, there is shown an alternative form of my invention, which is similar in principle to that already described except that the means for effecting movement of the main or piston valve have been segregated therefrom. In this view, the piston valve 50 controls the admission and exhaust of motive fluid to the operating cylinder 13. Instead, however, of having the cylinder for the piston valve and the piston valve provided with features incorporating the three piston areas or faces and the spaces or chambers asssociated therewith, these piston faces or areas and the spaces are incorporated in separate structure. Accordingly, there is shown a housing or cylinder structure 51 having a piston or plunger 52 therein, the piston or plunger having first and second piston areas 20' and 21', the structure 51 providing a first space or chamber 23' for the second piston area 21'. Steam is supplied to the first space or chamber 22' intermittently by means of a pilot valve operated, as before, by the operating piston. In like manner, water is supplied to and withdrawn from the second space or chamber 23' by a passageway arrangement including metered and displacement branches. The plunger 52 has an extension 57 of smaller diameter provided with a third piston area or face 39' facing in the same direction as the first piston face area 20', the third piston area or face 39' having a space or chamber 40' to which steam under suitable pressure is continuously supplied by means of the passage 41'.

The main piston valve 50 and the plunger 52 are provided with rods 63 and 64 pivotally connected to a lever 65, at 66 and 67, respectively, the pivotal connection, at 66, being at one end of the lever and the connection, at 67, being disposed intermediately of the length thereof. The rod 11 of the operating cylinder is connected to a lever 69 fulcrumed, at 70, and pivotally connected, at 71, to a link 72, which is pivotally connected, at 73, to the other end of the lever 65. With this arrangement, it will be apparent that movement of the operating piston or ram acts jointly with the effect of steam pressure applied to the third piston face or area 39' to control the position of the piston valve 50 so as to restrict the admission of steam to the operating piston to limit the velocity thereof.

In comparing the patent aforesaid with Figs. 1 and 2, it should be noted that, in the present invention, it is necessary to have steam pressure applied both to the first and third piston faces or areas in order that the effect of steam pressure may overcome the effect of water pressure applied to the second piston area; however, when the supply of steam to the first piston area is interrupted, the effect of steam pressure applied to the third piston area is insufficient to oppose movement of the piston valve due to water pressure applied to the second piston area. However, as steam is continuously applied to the third piston area or face, the intermittent supplying of steam to the first piston area face has the same effect as that disclosed in the patent, that is, when steam is supplied, the motor device for moving the main or piston valve moves in consequence of the steam pressure and against the water pressure; and, when the supply of steam is interrupted, the motor device is moved by the water pressure.

While I prefer and illustrate the means for limiting ram velocity associated with means for securing quick cut-off at ram stroke ends, it will be obvious that the velocity-limiting arrangement is applicable equally as well to engines not equipped for quick cut-off. Where the pressures applied to the first, second and third piston areas 20, 21 and 39 are equal, the areas are so selected that the sum of the first and third exceeds the second and the latter exceeds the third; however it is to be understood that the invention is susceptible of application to situations where the three pressures differ. Therefore, in accordance with the invention the areas and pressures are so selected as to secure operation in the manner already pointed out.

While I have shown my invention in several forms, it will be obvious to those skilled in the art that it is not so limited, but is susceptible of various other changes and modifications without departing from the spirit thereof.

What I claim is:

1. In a fluid motor, an operating cylinder; an operating piston in the cylinder; a slide valve controlling the admission and exhaust of motive fluid to opposite ends of the cylinder; means for moving the slide valve including first, second and third piston areas; said first and second piston areas being so disposed that the effects of pressures applied thereto are exerted on the slide valve in opposite directions and the effect of pressure applied to the third piston area is exerted on the slide valve in the same direction as the effect thereon of pressure applied to the first piston area; means providing first, second, and third chambers for the first, second, and third piston areas, respectively; means including a first passage for supplying fluid under pressure to the first chamber; an exhaust connection; a pilot valve movable by said operating piston as stroke ends of the latter are approached; said pilot valve placing the first chamber in communication with the first passage at one stroke end of the operating piston and placing such chamber in communication with the exhaust connection at the other stroke end thereof; a second passage for supplying fluid under pressure to or from the second chamber; means providing an orifice in the second passage; means for continuously supplying fluid under pressure to the third chamber; said piston areas and fluid pressures being so related that, when fluid under pressure is supplied to the first chamber, said means having the piston areas is moved, fluid under pressure being expelled from the second chamber through the second passage and its orifice, to move the slide valve to establish motive fluid connections for a working stroke of the operating piston in one direction, and, when the first chamber is placed in communication with the exhaust connection, said means provided with the piston areas is moved, due to flow of fluid under pressure through the second passage and its orifice to the second chamber, to move the slide valve to establish motive fluid connections for a working stroke of the operating piston in the other direction; and means responsive to the joint effect of operating piston movement and of fluid pressure applied to the third piston area for moving the slide valve to restrict the admission of motive fluid to the operating cylinder during working strokes of the operating piston to limit the velocity of the latter.

2. In a fluid motor, a source of steam under pressure; an operating cylinder; an operating piston in the cylinder; a slide valve controlling the admission of steam from said source to opposite ends of the cylinder and the exhaust of steam therefrom; said slide valve having first and second opposed piston areas and a third piston area facing in the same direction as the first piston area with the sum of the first and third piston areas exceeding the second and the second exceeding the third; means providing first, second and third chambers for the first, second and third piston areas, respectively; a first passage connected to said source of steam under pressure; an exhaust connection; a pilot valve movable by said operating piston as stroke ends of the latter are approached; said pilot valve placing the first chamber in communication with said first passage at one stroke end of the operating piston and placing such chamber in communication with the exhaust connection at the other stroke end thereof; a source of liquid under the same pressure as said steam pressure; a second passage connecting said liquid pressure source and the second chamber; means providing an adjustable orifice in the second passage; means for continuously supplying steam under pressure from said steam source to the third piston area; and means responsive to the joint effect of operating piston movement and of steam pressure applied to the third piston area for moving the slide valve to restrict the admission of steam to the operating cylinder during working strokes of the operating piston to limit the velocity of the latter.

3. In a fluid motor, an operating cylinder; an operating piston in the cylinder; a main valve controlling the admission and exhaust of motive fluid to the operating cylinder; means for moving the main valve including first, second, and third piston areas; said first and second piston areas being so disposed that the effects of pressures exerted thereon are applied to the main valve in opposite directions and the effect of pressure exerted on the third piston area is applied to the main valve in the same direction as the effect of pressure exerted on the first piston area; means providing first, second, and third chambers for the first, second, and third piston areas, respectively; means including a first passage for supplying fluid under pressure to the first chamber; an exhaust connection for the first chamber; a pilot valve movable by the operating piston, when the latter approaches the stroke end incident to movement in one direction, to connect said first chamber with said first passage, and, when it approaches the stroke end in the other direction, to connect said first chamber with said exhaust connection; a second passage providing for flow of fluid under pressure to or from the second chamber and including first and second branches; means providing an orifice in the first branch for determining the flow rate therethrough and consequently the duration of dwell of the operating piston at stroke ends of the latter; displacement means associated with the second branch and providing for flow to or from the second chamber at an increased rate when the operating piston reaches the end of each working stroke to effect movement of the main valve to cut off the supply of motive fluid to the operating cylinder for the ensuing dwell of the operating piston; means for continuously applying fluid under pressure to the third piston area; said piston areas and pressures having such relation that, with fluid supplied from the first passage to the first chamber, the main valve is moved with expulsion of fluid under pressure from the second chamber through the second passage and its orifice to establish motive fluid connections for a working stroke of the operating piston in one direction, and, with the first chamber placed in communication with its exhaust connection, said main valve is moved, due to fluid under pressure supplied through the second passage and its orifice to the second chamber, to establish motive fluid connections for a working stroke of the operating piston in the other direction; and means responsive to the joint effect of operating piston movement and of pressure applied to said third piston area for moving the main valve to restrict the admission of motive fluid to the operating cylinder during working strokes of the operating piston to limit the velocity of the latter.

4. In a fluid motor, an operating cylinder; an operating piston in the cylinder; a main valve for controlling the admission and exhaust of motive fluid to the operating cylinder and including movable and housing elements; means for moving the movable element and including first, second, and third piston areas formed on the latter; said first and third piston areas facing in the same direction and opposing the second piston area; said housing element providing first, second, and third chambers for the first, second, and third piston areas, respectively; means including a first passage for supplying fluid under pressure to the first chamber; an exhaust connection for the first chamber; a pilot valve movable by the operating piston, when the latter approaches the stroke end incident to movement in one direction, to connect the first chamber to said first passage, and, when it approaches the stroke end incident to movement in the other direction, to connect the first chamber to the exhaust connection; a second passage providing for flow of fluid under pressure to or from the second chamber and including first and second branches; a metering valve in the first branch for determining the flow rate therethrough and consequently the duration of dwell of the operating piston at stroke ends of the latter; displacement means associated with the second branch and providing for flow to or from the second chamber at an increased rate when the operating piston reaches the end of each working stroke to effect movement of the main valve to cut off the supply of motive fluid to the operating cylinder for the ensuing dwell interval of the operating piston; means for continuously supplying fluid under pressure to the third piston area; said piston areas and fluid pressures being so related that, with fluid under pressure supplied from the first passage to the first chamber, said main valve is moved with expulsion of fluid under pressure from the second chamber through the second passage and its orifice to establish motive fluid connections for a working stroke of the operating piston in one direction, and, with the first chamber placed in communication with its exhaust connection, said main valve is moved, due to fluid under pressure supplied through the second passage and its orifice to the second chamber, to establish motive fluid connections for a working stroke of the operating piston in the other direction; and means responsive to the joint effect of operating piston movement and of pressure applied to the third piston area for moving the main valve movable element to restrict the admission of motive fluid to the operating cylinder during working strokes of the operating piston to limit the velocity of the latter.

5. In a fluid motor, a source of steam under pressure; an operating cylinder; an operating piston in the cylinder; a main valve for controlling the admission of steam from said source to the operating cylinder and the exhaust of steam from the latter and including movable and housing elements; means for moving the movable element and including first, second, and third piston areas formed thereon; said first and third piston areas facing in the same direction and opposing the second piston area with the sum of the first and third areas exceeding the second and the second exceeding the third; said housing element providing first, second, and third chambers for the first, second, and third piston areas, respectively; means including a first passage for supplying steam from said source to the first chamber; an exhaust connection for the first chamber; a pilot valve movable by the operating piston, when the latter approaches the stroke end incident to movement in one direction, to connect the first chamber to said first passage, and, when it approaches the stroke end in the other direction, to connect the first chamber to its exhaust connection; a reservoir for liquid and communicating with said source of steam pressure so that the liquid is maintained at the pressure of the steam; a second passage, including first and second branches, providing for flow between the reservoir and the second chamber; a metering valve in the first branch for determining the flow rate therethrough and consequently the duration of dwell of the operating piston at stroke ends of the latter; displacement means associated with the second branch and providing for flow to or from the second chamber at an increased rate when the operating piston reaches the end of each working stroke to effect movement of the main valve to cut off the supply of steam to the operating cylinder for the ensuing dwell interval of the operating piston; means for continuously supplying steam from said source to the third chamber; and means responsive to operating piston movement for modifying the liquid pressure in said second chamber so that the joint effect thereof and of steam pressure applied to said third piston area restricts the admission of steam to the operating cylinder during working strokes of the operating piston to limit the velocity of the latter.

6. In a fluid motor, a source of steam under pressure; an operating cylinder; an operating piston in the cylinder; a main valve controlling the admission of steam from the source to the operating cylinder and the exhaust of steam from the latter and including a piston valve cylinder and a piston valve arranged therein; means for moving the piston valve including first, second, and third piston areas provided thereon; said first and third piston areas facing in the same direction and opposing the second piston area with the sum of the first and third areas exceeding the second and the second area exceeding the third; means including said piston valve cylinder and providing first, second, and third cylinder spaces for the first, second, and third piston areas, respectively; means including a first passage for supplying steam from said source to the first cylinder space; an exhaust connection for the first cylinder space; a pilot valve movable by the operating piston, when the latter approaches the stroke end incident to movement in one direction, to connect the first cylinder space to said passage, and, when it approaches the stroke end in the other direction, to connect the first cylinder space to its exhaust connection; a reservoir for liquid and communicating with the steam pressure source in order that the liquid may be maintained at the same pressure as the steam; a second passage, including first and second branches, providing for flow between the reservoir and the second cylinder space; a metering valve in the first branch for determining the duration of dwell of the operating piston at stroke ends of the latter; displacement means associated with the second branch and providing for flow to and from the second cylinder space at an increased rate when the operating piston; means for continuously working stroke to effect movement of the main valve to cut off the supply of steam to the operating cylinder for the ensuing dwell interval of the operating piston; means for continuously supplying steam from said source to the third cylinder space; means providing an expansible and contractible chamber communicating with said second cylinder space and including relatively movable cylinder and plunger elements; and means for operatively connecting one of said elements to the operating piston so that the modification in liquid pressure in said second cylinder space secured by the discharge of liquid thereinto or the withdrawal of liquid therefrom by the expansible and contractible chamber during working strokes of the operating piston serves jointly, with the effect of steam pressure applied to said third piston area, to restrict the admission of steam to the operating cylinder during working strokes of the operating piston to limit the velocity of the latter.

EARLL R. STONE.

CERTIFICATE OF CORRECTION.

Patent No. 2,201,248. May 21, 1940.

EARLL R. STONE.

It is hereby certified that error appears in the printed specification of the above numbered patent requiring correction as follows: Page 5, second column, line 30, claim 6, for "the operating piston; means for continuously" read --the operating piston reaches the end of each--; and that the said Letters Patent should be read with this correction therein that the same may conform to the record of the case in the Patent Office.

Signed and sealed this 9th day of July, A. D. 1940.

(Seal)

Henry Van Arsdale,
Acting Commissioner of Patents.